United States Patent
Kim et al.

(10) Patent No.: US 10,178,695 B2
(45) Date of Patent: Jan. 8, 2019

(54) COMMUNICATION METHOD FOR PREVENTING SIGNAL COLLISION IN PEER AWARE COMMUNICATION SYSTEM AND APPARATUS FOR TRANSMITTING/RECEIVING USING THE METHOD

(71) Applicant: ELECTRONICS AND TELECOMMUNICATIONS RESEARCH INSTITUTE, Daejeon (KR)

(72) Inventors: Hyung Jin Kim, Daejeon (KR); Seokki Kim, Daejeon (KR); Sung Cheol Chang, Daejeon (KR); Hyunsu Kim, Bucheon-si (KR); Jimin Bae, Daejeon (KR); Jihoon Choi, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 635 days.

(21) Appl. No.: 14/514,122

(22) Filed: Oct. 14, 2014

(65) Prior Publication Data
US 2015/0103783 A1    Apr. 16, 2015

(30) Foreign Application Priority Data

Oct. 15, 2013 (KR) .................. 10-2013-0122559
Oct. 8, 2014 (KR) .................. 10-2014-0136188

(51) Int. Cl.
*H04W 74/08* (2009.01)
*H04L 5/00* (2006.01)

(52) U.S. Cl.
CPC ....... *H04W 74/0816* (2013.01); *H04L 5/0044* (2013.01); *H04L 5/0053* (2013.01)

(58) Field of Classification Search
CPC . H04W 74/0816; H04L 5/0044; H04L 5/0053
See application file for complete search history.

(56) References Cited

U.S. PATENT DOCUMENTS

| | | | | |
|---|---|---|---|---|
| 2007/0280148 | A1* | 12/2007 | Ding | H04W 52/286 370/318 |
| 2008/0273606 | A1* | 11/2008 | Orfanos | H04L 5/003 375/260 |
| 2012/0294245 | A1 | 11/2012 | Chang et al. | |
| 2014/0192820 | A1* | 7/2014 | Azizi | C12N 15/74 370/445 |

OTHER PUBLICATIONS

"Subcarrier Assignment, Signal Design, Receiver Structure", Electronics and Telecommunications Research Institute, Oct. 15, 2013.

* cited by examiner

*Primary Examiner* — Bo Hui A Zhu
(74) *Attorney, Agent, or Firm* — Rabin & Berdo, P.C.

(57) ABSTRACT

A communication method in a peer aware communication system and an apparatus for transmitting/receiving using the communication method are provided. A block signal for informing of channel occupation is generated and then is transmitted through an interval in which a message signal including a preamble signal is not transmitted. A subcarrier for the block signal is different from a subcarrier for the preamble signal.

14 Claims, 13 Drawing Sheets

COMMUNICATION METHOD FOR PREVENTING SIGNAL COLLISION IN PEER AWARE COMMUNICATION SYSTEM AND APPARATUS FOR TRANSMITTING/RECEIVING USING THE METHOD

CROSS-REFERENCE TO RELATED APPLICATION

This application claims priority to and the benefit of Korean Patent Application No. 10-2013-0122559 and No. 10-2014-0136188 filed in the Korean Intellectual Property Office on Oct. 15, 2013 and Oct. 8, 2014, the entire contents of which are incorporated herein by reference.

BACKGROUND OF THE INVENTION (a) Field of the Invention

The present invention relates to a communication method in a peer aware communication system and an apparatus for transmitting/receiving by using the same.

(b) Description of the Related Art

There is no entity for managing all communication links in direct communication between terminals, unlike the existing infra network. Accordingly, each terminal has to individually search neighboring terminals and to fairly allocate radio resources to them through message sharing between the neighboring terminals. When direct communication is performed in an allowable band, a terminal is synchronized to a base station and may share allocation information with the base station in a process of allocating radio resources, and thereby it is possible to minimize interference or signal collision between terminals although a large number of terminals are involved in direct communication.

However, when direct communication is performed in an unlicensed band, radio resources are shared with terminals in a state in which only loose synchronization between the terminals is matched. The radio resource sharing may be performed with a carrier sensing multiple access (CSMA) in a wireless local area network (WLAN) generally used in an unlicensed band. When a CSMA-based wireless access scheme is used for direct communication in an unlicensed band, if the number of terminals involved in the direct communication increases, the overall transmission performance is degraded.

To solve such a problem, a scheme for using a synchronous frame structure for direct communication in an unlicensed band has been researched, and recently, standardization for the scheme has been underway. When using the synchronous frame structure, if there are a large number of terminals that simultaneously access by using direct communication, it is possible to minimize signal collision between terminals by previously scheduling transmission time for each terminal. Accordingly, the synchronous frame structure has higher transmission efficiency than that of an asynchronous-based CSMA scheme if the number of terminals simultaneously accessing increases in a direct communication-based peer aware communication system. To use the synchronous frame structure, however, time synchronization between terminals involved in direct communication has to be matched.

An orthogonal frequency division multiplexing (OFDM) transmission scheme is used in a peer aware communication system. In this case, in order to use the synchronous frame structure, the initialization for frame transmission time and OFDM symbol transmission time is needed in a transmission initialization process. Also, a receiving end has to estimate and compensate a carrier frequency error of a transmitting end and the receiving end to minimize interference between subcarriers in the receiving end.

In addition, when a synchronous demodulation scheme is used in a receiving end, channel estimation is needed. Generally, in the OFDM transmission scheme, the transmitting end and the receiving end transmit a previously promised signal pattern in a form of preamble for synchronization of the symbol transmission, frequency synchronization, and channel estimation. The preamble used in a peer aware communication system has to be separated from the preamble used in a system that is used in an unlicensed band such as a WLAN.

Unlike the allowable band for a specific communication system, a plurality of communication devices using different transmission schemes coexist with each other in the unlicensed band, while they may serve as interference each other. For example, a terminal for WLAN and a terminal for peer aware communication are used in the same environment, while they cause interference with each other. To reduce the interference, the channel occupation is recognized so that collisions with systems using different communication standards are minimized. For this, when there are an existing WLAN system and a peer aware communication system, the existing WLAN system needs a method for determining whether a channel is occupied by the peer aware communication system. At this time, the standards of the hardware and software are not changed in the existing WLAN system, and thereby it is preferred to add corresponding functions to the peer aware communication system which is being developed.

Since the peer aware communication system uses time division multiple access in accessing channel resources, signals are discontinuously transmitted even though data transmission starts after interference sensing. Therefore, even though a terminal of the peer aware communication occupies a channel and is then performing data transmission, a case in which other systems such as a WLAN system are unaware of the channel occupation by the terminal of the peer aware communication can occur. In this case, the peer aware communication system and the WLAN system simultaneously transmit signals, and thereby transmission performance is sharply degraded by signal collision between them.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a communication method of preventing signal collision between a peer aware communication system and a system of a different communication standard and an apparatus for transmitting/receiving by using the communication method.

Also, the present invention has been made in an effort to provide a communication method of transmitting a preamble signal in the peer aware communication system to prevent signal collision with the system of a different communication standard and an apparatus for transmitting/receiving by using the communication method.

In addition, the present invention has been made in an effort to provide a communication method of transmitting a blocking signal informing that a channel is being used in an interval in which a signal is not transmitted during data transmission in the peer aware communication system to prevent signal collision with the system of a different communication standard, and an apparatus for transmitting/receiving by using the communication method.

An exemplary embodiment of the present invention provides a communication method in a peer aware communication system. The communication method includes: generating, by a transmitting apparatus, a block signal for informing of channel occupation; and transmitting, by a transmitting apparatus, the block signal through an interval in which a message signal including a preamble signal is not transmitted.

A subcarrier for the block signal may be different from a subcarrier for the preamble signal.

The transmitting apparatus may transmit the block signal in a case in which the peer aware communication system and other systems using different communication standards coexist in an unlicensed band.

The communication method may further include generating a preamble signal, and transmitting the preamble signal with subcarriers satisfying a predetermined condition.

The subcarriers satisfying a predetermined condition may include an even-numbered subcarrier except for predetermined n-th subcarriers among subcarriers included within a predetermined range.

The subcarrier for the block signal may include the predetermined n-th subcarriers.

In the transmitting of a block signal, at least two the predetermined n-th subcarriers may be used for transmitting the block signal.

In the transmitting of a preamble signal, the preamble signal may be transmitted through a discovery channel in a frequency domain, wherein among the entire subcarriers included in symbols that are used in transmitting a preamble signal on the discovery channel, the subcarriers satisfying the predetermined condition may be used for transmitting the preamble signal and the predetermined n-th subcarriers may be used for transmitting the block signal.

In the transmitting of a block signal, transmission power of the preamble signal may be greater than that of the block signal.

The communication method may further include receiving, by a receiving apparatus, a signal transmitted from the transmitting apparatus and eliminating the block signal from the received signal.

The eliminating of the block signal may include regenerating a block signal based on the received signal, and subtracting the regenerated block signal from the received signal to eliminate the block signal from the received signal.

The regenerating of a block signal may include: estimating a channel of the block signal based on the received signal to obtain a channel estimate of the block signal; estimating a block signal values of the block signal in a time domain; and regenerating the block signal based on the channel estimate of the block signal and the block signal value of the block signal in a time domain.

The subtracting the regenerated block signal may include delaying the received signal by a predetermined number of samples, and subtracting the regenerated block signal from the delayed received signal to eliminate the block signal from the received signal.

Another exemplary embodiment of the present invention provides a transmitting apparatus. The transmitting apparatus includes: a block signal generator for generating a block signal; and a transmitter for transmitting a preamble signal or transmitting a block signal through an interval in which a message signal including a preamble signal is not transmitted.

A subcarrier for the block signal may be different from a subcarrier for the preamble signal.

A subcarrier for the preamble signal may include an even-numbered subcarrier except for predetermined n-th subcarriers among subcarriers included within a predetermined range, and a subcarrier for the block signal may include the predetermined n-th subcarriers.

The transmitting apparatus may transmit the block signal in a case in which the peer aware communication system and other systems using different communication standards coexist in an unlicensed band to inform the other systems of channel occupation.

Yet another embodiment of the present invention provides a receiving apparatus. The receiving apparatus includes: a receiver for receiving a signal; a block signal eliminator for eliminating a block signal from the received signal, wherein the block signal is transmitted through an interval in which a message signal including a preamble signal is not transmitted; and a received signal processor for processing the received signal from which the block signal is eliminated.

The received signal processor may include: a block signal channel for estimating a channel of the block signal based on the received signal to obtain a channel estimate of the block signal; a block signal regenerator for estimating a block signal value of the block signal in a time domain and regenerating the block signal based on the channel estimate of the block signal and the block signal value of the block signal in a time domain; a delay processor for delaying and outputting the received signal; and a signal eliminator for subtracting the regenerated block signal from the delayed received signal to eliminate the block signal from the received signal.

A subcarrier for the block signal may be different from a subcarrier for the preamble signal.

DETAILED DESCRIPTION OF THE EMBODIMENTS

Figure 1:
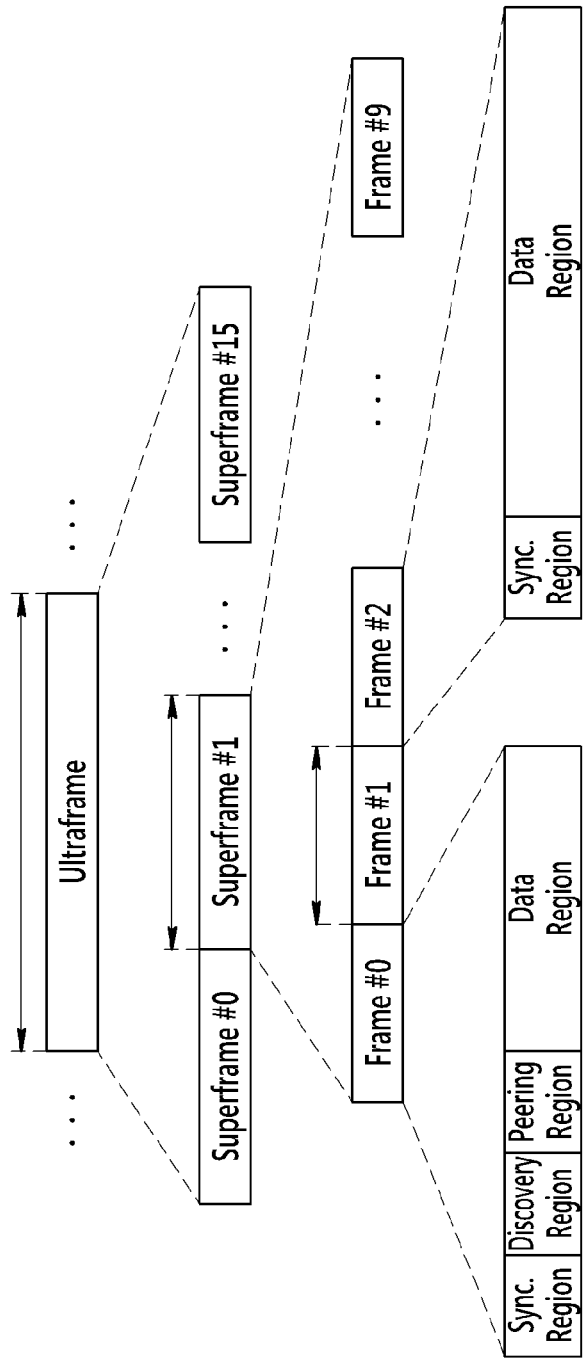
FIG. 1 shows a structure of a frame of a peer aware communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification, in addition, unless explicitly described to the contrary, the word "comprise" and variations such as "comprises" or "comprising" will be understood to imply the inclusion of stated elements but not the exclusion of any other elements.

Hereinafter, a communication method in a peer aware communication system and an apparatus using the method according to an exemplary embodiment of the present invention will be described.

FIG. 1 shows a structure of a frame of a peer aware communication system according to an exemplary embodiment of the present invention.

As shown in FIG. 1, an ultraframe includes a plurality of superframes (e.g. 16 superframes), and each of the superframes includes a plurality of frames (e.g. 10 frames). The frames of the superframe are divided into two types, and specifically are divided into a type 0 of frames and a type 1 of frames. Among 10 frames of one superframe, the first frame may use the type 0 and the remaining ones may use the type 1. The type 0 of frames includes a synchronization channel for matching time synchronization between terminals, a discovery channel for determining the state and location of the neighboring terminals, a peering channel for communication link establishment between terminals, and a data channel.

In the peer aware communication system, the ultraframes as shown in FIG. 1 are repeatedly transmitted, and direct communication between terminals and multiple access between links of terminals are supported.

Figure 2:
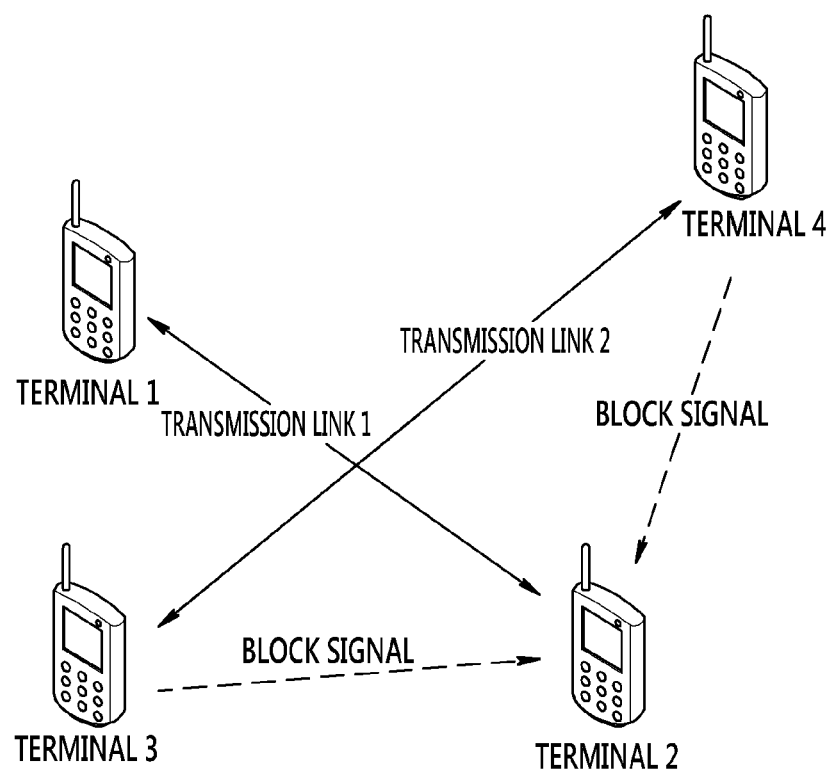
FIG. 2 shows a communication environment between terminals in a peer aware communication system according to an exemplary embodiment of the present invention.

FIG. 2 shows a communication environment between terminals in a peer aware communication system according to an exemplary embodiment of the present invention. Specifically, a case in which a terminal 1 performs peer aware communication with a terminal 2 and a terminal 3 performs peer aware communication with a terminal 4 is shown in FIG. 2.

Figure 3:
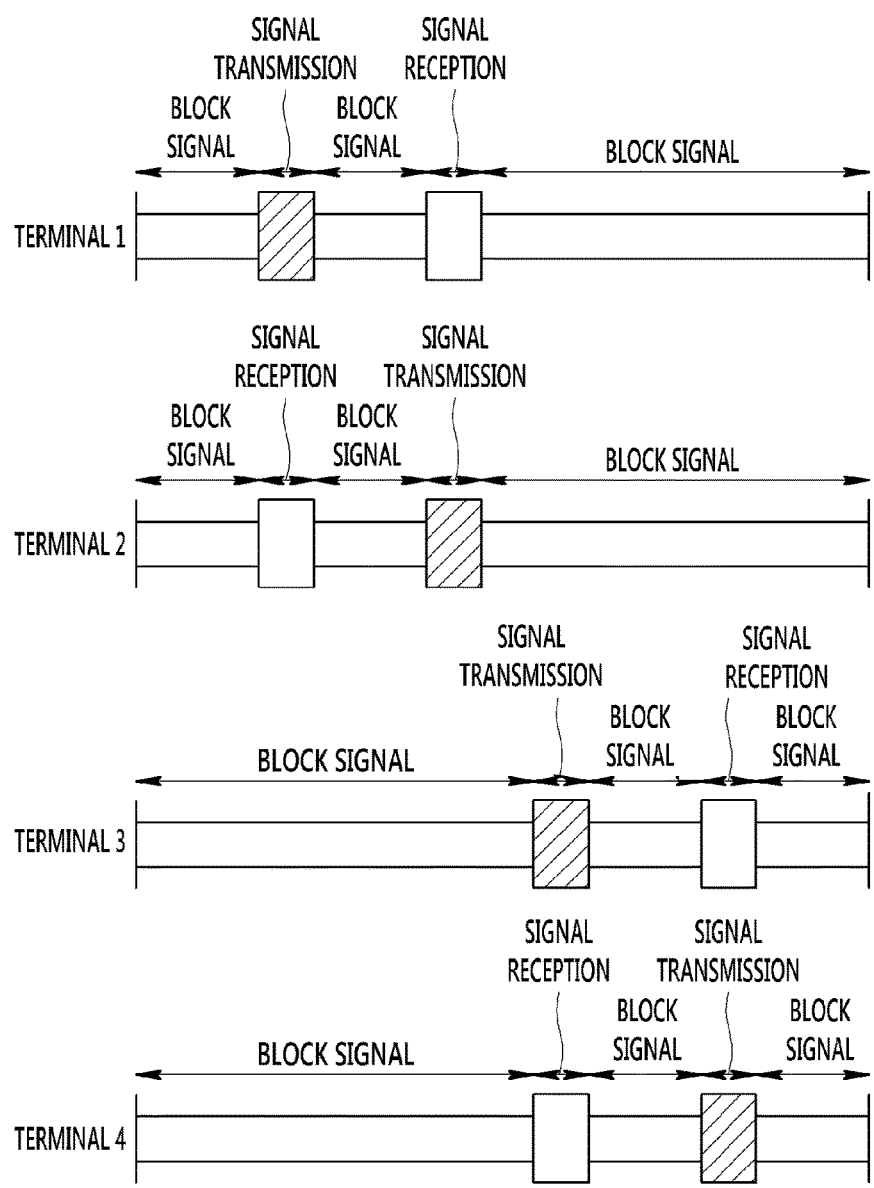
FIG. 3 shows an operation scenario of terminals in a peer aware communication system according to an exemplary embodiment of the present invention.

FIG. 3 shows an operation scenario of terminals in a peer aware communication system according to an exemplary embodiment of the present invention.

Referring to FIG. 2 and FIG. 3, signal transmitting/receiving between terminals in a peer aware communication system according to an exemplary embodiment of the present invention will be described.

According to an exemplary embodiment of the present invention, when a peer aware communication system occupies a channel, a blocking signal informing that the channel is being used is transmitted, by using some carrier in an interval in which a signal is not transmitted during data transmission, to other systems of a different communication standard using an unlicensed band. As shown in FIG. 3, the terminal 1 communicates with the terminal 2 through a transmission link 1 and the terminal 3 communicates with the terminal 4 through a transmission link 2. The transmission time between the terminals 1 and 2 is different from the transmission time between the terminals 3 and 4. According to an exemplary embodiment of the present invention, the terminal 1 and the terminal 2 transmit blocking signals in the remaining interval except for the interval in which signal transmitting or signal receiving between the terminal 1 and the terminal 2 is performed. Through this blocking signal transmission, a terminal informs other unlicensed band systems that the channel is being used. Here the other unlicensed band systems represent systems (e.g., a terminals communicating in a wireless local area network (WLAN) and others) in which communication based on a different communication standard than the peer aware communication takes place in unlicensed bands. Like the blocking signal transmission of the terminals 1 and 2, the terminal 3 and the terminal 4 transmit blocking signals in the remaining interval except for the interval in which signal transmitting or signal receiving between the terminal 1 and the terminal 2 is performed.

In an environment in which a peer aware communication system and other unlicensed band system coexist, the block signal is transmitted to prevent signal collision between them. The block signal is a signal used for informing, by a terminal according to the peer aware communication system, the other unlicensed band system of channels used in an interval in which a signal is not transmitted during data transmission.

Meanwhile, when considering terminal arrangement of a communication environment as in FIG. 2, a terminal having received a signal from a corresponding terminal through a transmission link for the peer aware communication may simultaneously receive a block signal transmitted by a neighboring terminal in addition to a signal transmitted by the corresponding terminal of the transmission link. For example, when the terminal 2 receives a signal from the terminal 1, the terminal 2 simultaneously receives block signals transmitted from the terminal 3 and the terminal 4 in addition to the signal transmitted from the terminal. Here, the block signals may act as interference. Like this, when the terminal 1 receives a signal, block signals transmitted from the terminals 3 and 4 may act as interference. Also, when the terminal 3 or the terminal 4 receives a signal, block signals transmitted from the terminals 1 and 2 may act as interference.

In an exemplary embodiment of the present invention, a preamble signal is transmitted with a subcarrier satisfying a predetermined condition, and the position of the subcarrier for the preamble signal is different from the position of the subcarrier of a block signal so that the interference caused by a block signal is minimized.

In synchronous peer aware communication, a signal is transmitted based on an orthogonal frequency division multiplexing (OFDM) method. Here, symbol time synchronization therebetween has to be consistent within a certain level, and a receiving end has to estimate and compensate frequency errors to prevent interference between subcarriers.

Also, the receiving end has to estimate for synchronous demodulation. For the time and frequency synchronization and the channel estimation, a preamble signal is transmitted before transmitting a message in the synchronous peer aware communication system.

Figure 4:
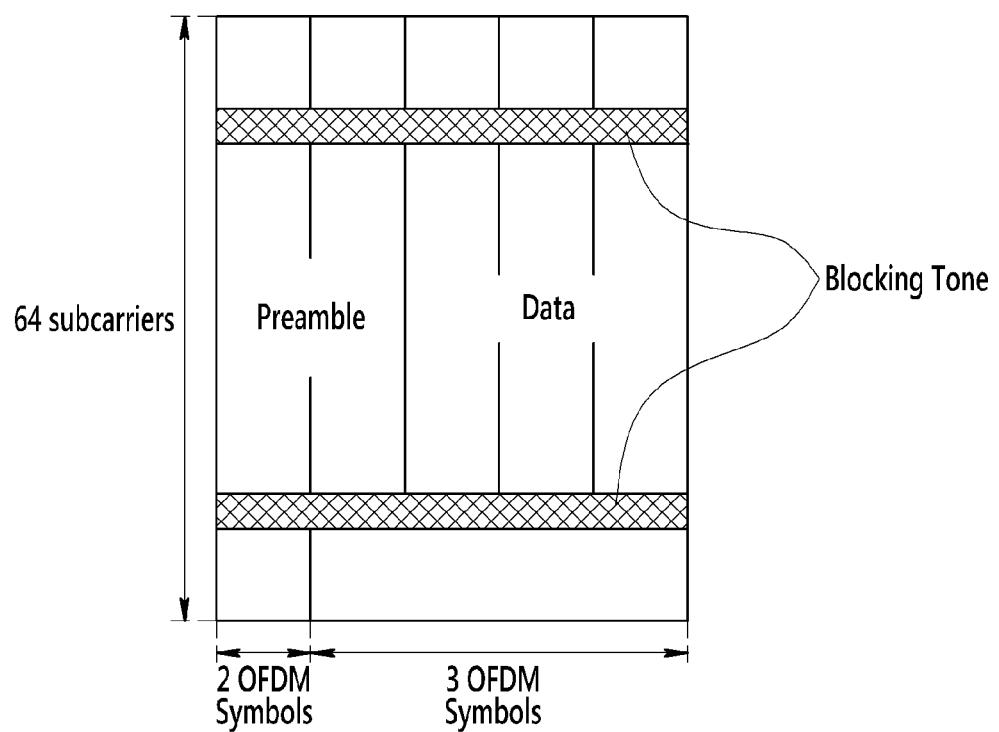
FIG. 4 shows transmission of a preamble in a synchronous peer aware communication system according to an exemplary embodiment of the present invention.

FIG. 4 shows transmitting a preamble in a synchronous peer aware communication system according to an exemplary embodiment of the present invention.

$$S_{-28:28} = \begin{bmatrix} 1, & 0, & 1, & 0, & -1, & 0, & -1, & 0, & -1, & 0, & -1, & 0, & 0, & 0, & -1, & 0, \\ -1, & 0, & -1, & 0, & -1, & 0, & -1, & 0, & 1, & 0, & -1, & 0, & 0, & 0, & 1, & 0, \\ 1, & 0, & -1, & 0, & 1, & 0, & -1, & 0, & 1, & 0, & 1, & 0, & 0, & 0, & -1, & 0, \\ -1, & 0, & 1, & 0, & 1, & 0, & -1, & 0, & -1 & & & & & & & \end{bmatrix} \quad \text{[Equation 1]}$$

In the peer aware communication system according to an exemplary embodiment of the present invention, as an example shown in FIG. 4, a preamble signal is transmitted through a discovery channel in a frequency domain. The discovery channel includes, for example, 64 resource units (RU), and one RU includes 5 symbols as shown in FIG. 4. Among the symbols consisting of one RU, the first two symbols are used in transmitting a preamble signal and the remaining 3 symbols are used in transmitting discovery data. One symbol includes, for example, 64 subcarriers. In FIG. 4, a blocking tone represents a subcarrier at which a block signal is transmitted and that is not used for discovery signal transmission.

A preamble signal is transmitted according to exemplary embodiment of the present invention as follows.

Figure 5:
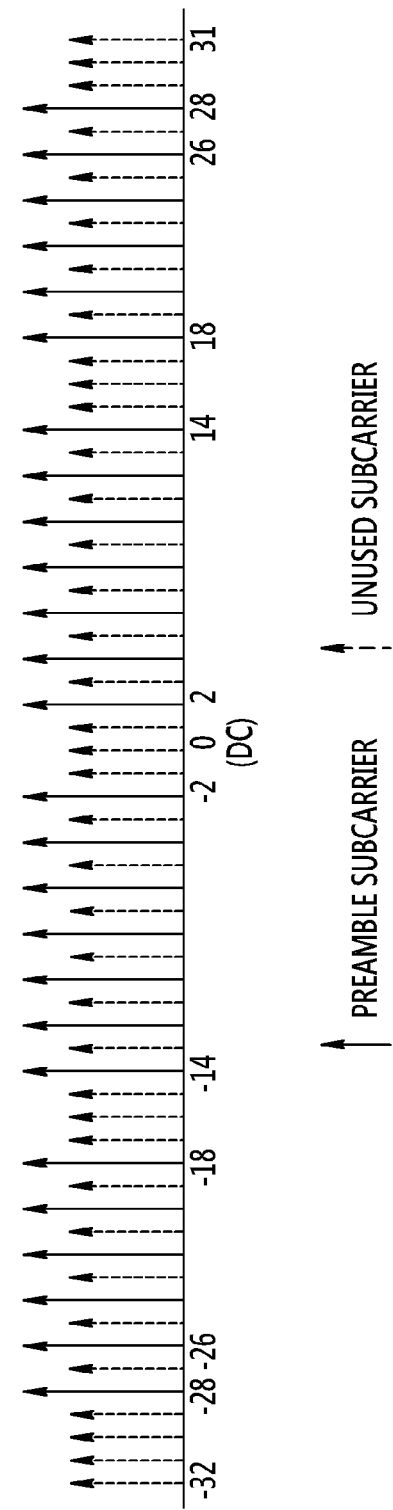
FIG. 5 shows subcarrier arrangement for preamble transmission according to an exemplary embodiment of the present invention.

FIG. 5 shows subcarrier arrangement for preamble transmission according to an exemplary embodiment of the present invention.

In an exemplary embodiment of the present invention, as shown in FIG. 5, among all subcarriers (e.g., 64 subcarriers), subcarriers satisfying a predetermined condition are used for transmitting a preamble signal.

The predetermined condition represents the even-numbered subcarriers except for the n-th subcarriers among subcarriers included within a predetermined range. For example, when 64 subcarriers are disposed as in FIG. 5, 26 even-numbered subcarriers are used for transmitting a preamble except for the −16th subcarrier, the 0th subcarrier, and the +16th subcarrier among subcarriers between the −28th subcarrier and the +28th subcarrier. Here, the 0th subcarrier is used in transmitting a preamble signal to prevent interference caused by a direct current (DC) signal, and the −16th subcarrier and the +16th subcarrier are used in transmitting a preamble signal to prevent interference caused by a block signal.

The preamble signals with the subcarriers (e.g., the 26 subcarriers) satisfying the predetermined condition the pre-promised sequence between a transmitting end and a receiving end, and the sequence may be modulated by various scheme (e.g., binary phase shift keying (BPSK), quadrature phase shift keying (QPSK), and others) and then be transmitted.

The preamble signal may be designed so that the correlation with the short preamble and long preamble of the other unlicensed band system (e.g., a WLAN system) in a time domain is small enough.

For this purpose, according to an exemplary embodiment of the present invention, a terminal of the peer aware communication system may clearly distinguish between a preamble signal of the peer aware communication and a preamble signal of the other unlicensed band system (hereinafter, for convenience of explanation, it is referred to as a preamble signal of the WLAN).

As an example of the preamble signal of the peer aware communication, the preamble signal may be represented as follows when the BPSK is used in modulating the sequence of preamble.

The preamble signal according to this exemplary embodiment of the present invention, is designed so that the correlation with the short preamble and long preamble of the WLAN system, and thereby a receiving end can clearly distinguish between the preamble of the peer aware communication and the preamble of the WLAN.

As shown in FIG. 4, when transmitting a preamble signal through the discovery channel in a frequency domain, two symbols consisting of one RU are used. The preamble signal represented as Equation 1 is repeatedly transmitted during the intervals of the two symbols. At this time, since preamble signals are transmitted by using the smaller number of subcarriers compared with data transmission, it is possible to set the transmission power of the subcarrier for the preamble signal to be equal to or higher than that of the subcarrier for data.

Meanwhile, according to an exemplary embodiment of the present invention, the position of the subcarrier for transmitting a block signal is different from the position of the subcarrier for the preamble signal.

Figure 6:
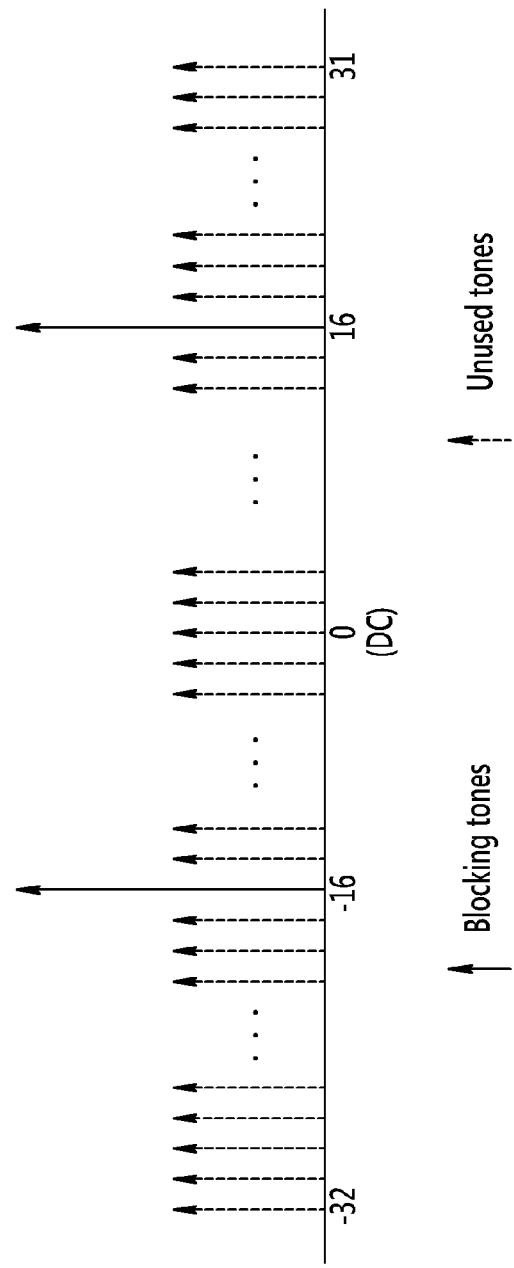
FIG. 6 shows subcarrier arrangement for block signal transmission according to an exemplary embodiment of the present invention.

FIG. 6 shows subcarrier arrangement for block signal transmission according to an exemplary embodiment of the present invention.

According to an exemplary embodiment of the present invention, as in FIG. 6, a block signal is transmitted with the n-th subcarrier among all subcarriers (e.g., 64 subcarriers) included within a predetermined range. For example, when 64 subcarriers are arranged as in FIG. 6, among subcarriers within the predetermined range, that is, subcarriers between the −28th subcarrier and the +28th subcarrier, the −16th subcarrier and the +16th subcarrier of the n-th subcarriers are used for transmitting a preamble signal. Here, the 0th subcarrier as described above is not used to prevent interference cause by a DC signal.

As an example of transmitting a block signal, a block signal with two subcarriers may be represented as follows.

$$P\text{-}16 = P16 = 1 \quad \text{[Equation 2]}$$

At this time, since the block signal is transmitted by using the smaller number of subcarriers compared with data transmission, it is possible to set the transmission power of the subcarrier for the block signal to be equal to or higher than that of the subcarrier for data.

The subcarriers (e.g., the −16th subcarrier and the +16th subcarrier) for the block signal are not used in transmitting a preamble signal or a control signal. It is preferred that the minimum number of subcarriers is allocated for transmitting a block signal.

In an exemplary embodiment of the present invention, the position of subcarriers for the block signal is set in consideration of channel construction in an unlicensed band.

Figure 7:
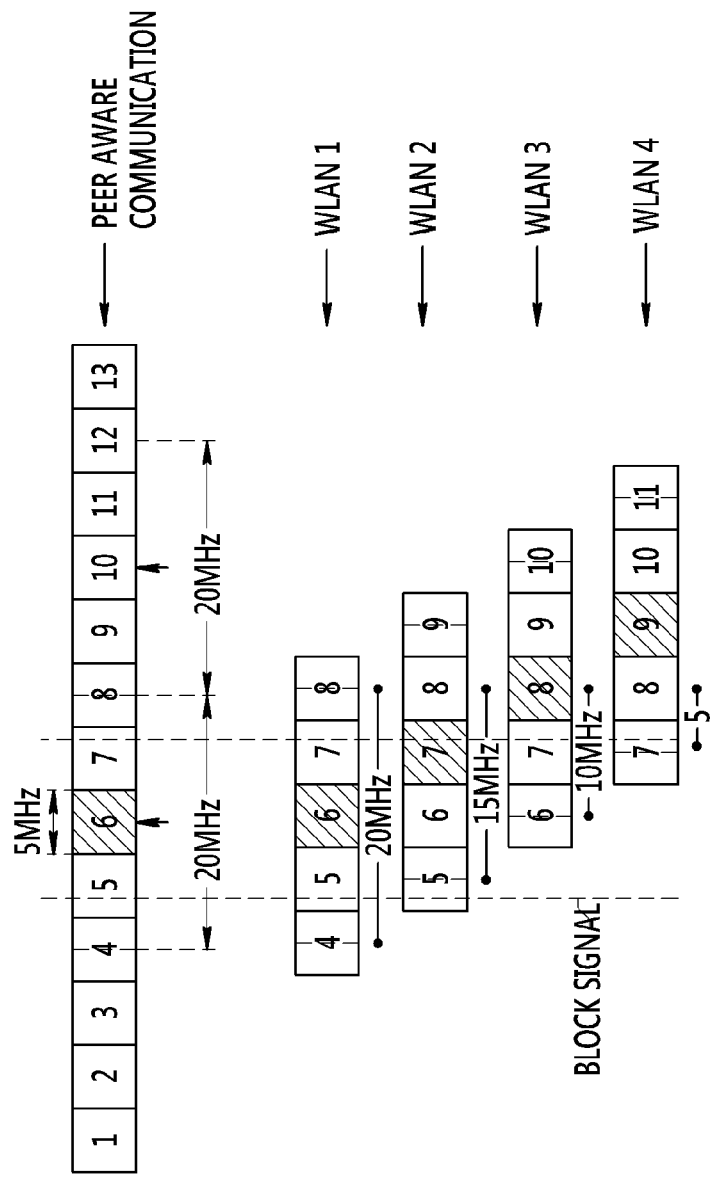
FIG. 7 shows block signal position setting according to an exemplary embodiment of the present invention.

FIG. 7 shows block signal position setting according to an exemplary embodiment of the present invention.

A 2.4 GHz band includes, as shown in FIG. 7, may include 13 channels of CH1-CH13 and each channel has a bandwidth of 5 MHz. For example, the minimum bandwidth of 20 MHz is used in the WLAN system and a bandwidth of MHz is used in the peer aware communication system. In this case, the bandwidths of the peer aware communication system and the WLAN system overlap each other in one of 4 types (a WLAN 1, a WLAN 2, a WLAN 3, and a WLAN 4) as shown in FIG. 7.

As shown in FIG. 7, when one channel has a bandwidth of about 5 MHz and each communication system uses the minimum bandwidth of 20 MHz, it is assumed that the center frequency of the peer aware communication system is a CH 6. At this time, the bandwidth of the WLAN 1 having the center frequency of a CH6 is equal to the bandwidth of the peer aware communication system, and thereby the bandwidth of 20 MHz is overlapped between them. Also, the bandwidth of the WLAN 2 having the center frequency of a CH7 overlaps bandwidth of the peer aware communication system by 15 MHz, the bandwidth of the WLAN 3 having the center frequency of a CH8 overlaps bandwidth of the peer aware communication system by 10 MHz, and the bandwidth of the WLAN 4 having the center frequency of a CH9 overlaps bandwidth of the peer aware communication system by 5 MHz. In FIG. 7, the bandwidth of the WLAN may be positioned on the left side than the bandwidth of the peer aware communication.

In an exemplary embodiment of the present invention, the positions of subcarriers for a block signal are set as the −16th and +16th in consideration of the construction of the unlicensed band of 2.4 GHz.

The WLAN systems as the WLAN 1, the WLAN 2, the WLAN 3, and WLAN 4 in FIG. 7 may receive at least one among block signals transmitted from the peer aware communication system. Accordingly, the WLAN system may recognizes the channel occupation of the peer aware communication system based on the block signal. Meanwhile, when one subcarrier is used in transmitting a block signal, the WLAN system may not receive a block signal although the peer aware communication is using a channel. According to an exemplary embodiment of the present invention, two subcarriers are used in transmitting a block signal, and thereby it is possible to minimize the case in which the other unlicensed band system cannot receive a block signal.

Figure 8:
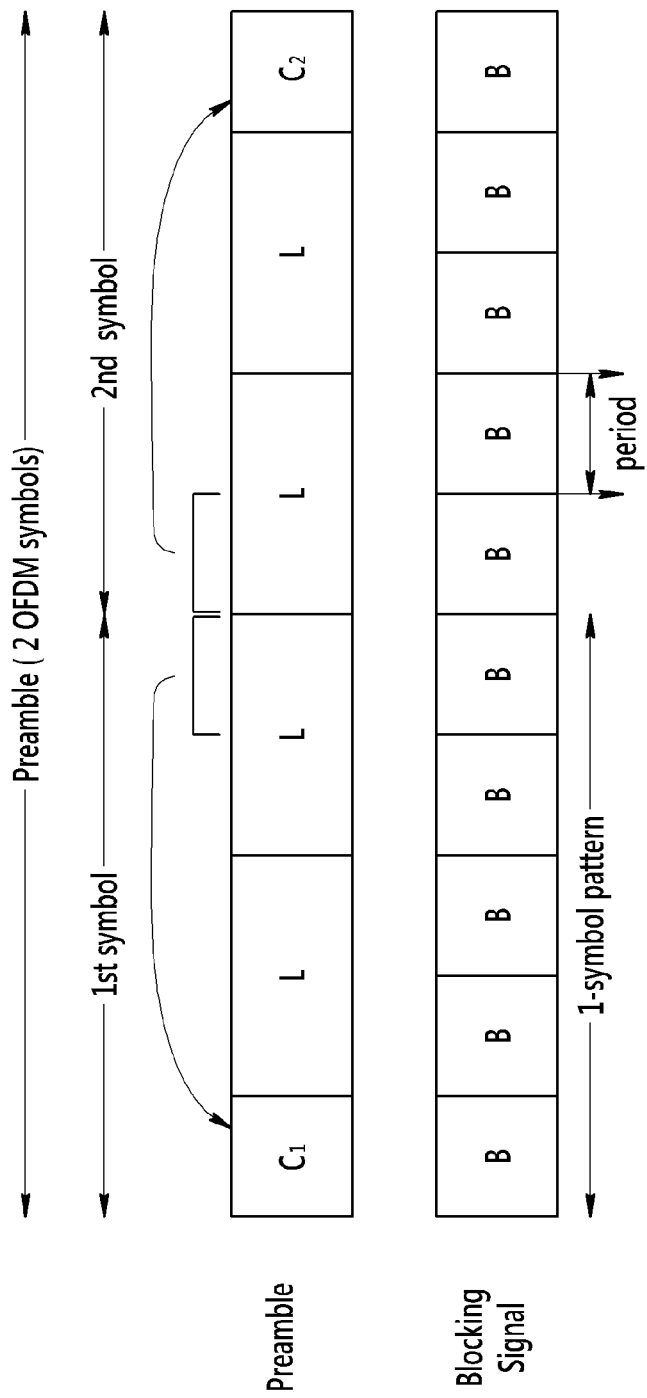
FIG. 8 shows a block signal and a preamble signal in a time domain according to an exemplary embodiment of the present invention.

FIG. 8 shows a block signal and a preamble signal in a time domain according to an exemplary embodiment of the present invention.

A preamble signal in a time domain may be calculated as the following Equation 3 by performing an inverse fast Fourier transform (IFFT) with a preamble in a frequency domain.

$$x_n = \frac{1}{\sqrt{N}} \sum_{k=-N/2}^{N/2-1} s_k e^{\frac{j2\pi kn}{N}}, 0 \le n \le N-1 \quad \text{[Equation 3]}$$

Here, N represents a size of an FFT and $s_k$ represents a preamble signal with the k-th subcarrier in a frequency domain.

In a peer aware communication, N=64 is used. Since a preamble signal uses an even-numbered subcarrier in a frequency domain as above, in the preamble signal in a time domain after the IFFT of the preamble signal in a frequency domain, the same pattern (L) per symbol occurs in a form of being repeated twice as shown in FIG. 8.

The pattern L is represented by using the $x_n$ in Equation 3, as follows.

$$L=[x_0,x_1,\ldots,x_{31}]=[x_{32},x_{33},\ldots,x_{63}] \quad \text{[Equation 4]}$$

In FIG. 8, $C_1$ and $C_2$ represent cyclic prefixes (CPs) of the first symbol and the second symbol in a time domain, respectively, and may be represented as follows.

$$C_1=x_{16},x_{17},\ldots,x_{31}$$

$$C_2=x_0,x_1,\ldots,x_{15} \quad \text{[Equation 5]}$$

If a preamble signal is represented as Equation 4 and Equation 5, even though time synchronization is not matched between a transmitting end and a receiving end, the preamble signal of a frequency domain may be recovered without distortion.

Meanwhile, a block signal in a time domain may be calculated by performing the IFFT for a block signal of a frequency domain as follows.

$$b_n = \frac{1}{8}\left(p_{-16}e^{-\frac{j\pi n}{2}} + p_{16}e^{\frac{j\pi n}{2}}\right), 0 \le n \le 79 \quad \text{[Equation 6]}$$

Since a block signal uses the −16th subcarrier and the +16th subcarrier and does not use the remaining subcarriers among the subcarriers within a predetermined range, as shown in FIG. 8, the symbol pattern of a period 4 occurs in a form of being repeated twenty times in a time domain in the block signal. In FIG. 8, B representing a block signal represents a sequence in which a pattern of a period 4 is repeated 4 times, and may be represented as follows.

$$B=[b_0,b_1,b_2,b_3,b_0,b_1,b_2,b_3,b_0,b_1,b_2,b_3,b_0,b_1,b_2,b_3] \quad \text{[Equation 7]}$$

The above structure of a preamble signal and a block signal according to an exemplary embodiment of the present invention may be used in the peering channel of the peer aware communication system, transmitting a peering identifier (PID), and transmitting a data scheduling request (DS-REQ) message and a data scheduling response (DS-RSP) message, as well as in the discovery channel of the peer aware communication system in FIG. 4. The method of transmitting the preamble signal and the block signal is the same as above, but the number of symbols and content of the message that is transmitted subsequent to the preamble signal are changed. The same structure of the preamble signal may be used in transmitting a data packet and a block signal is not used in the interval for transmitting data packet.

Figure 9:
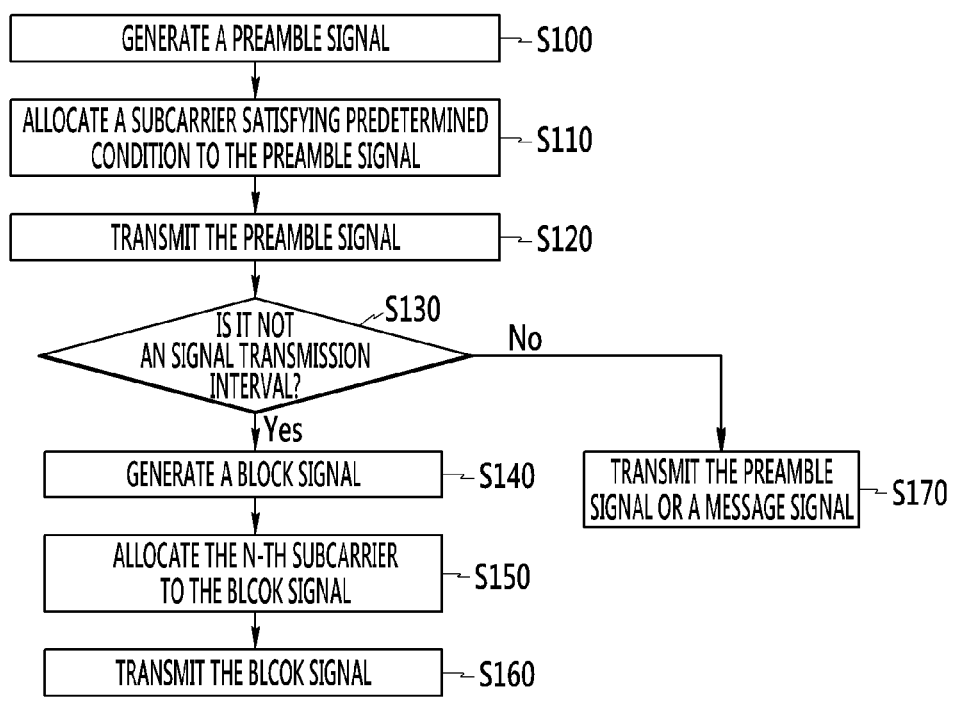
FIG. 9 shows a flowchart of a communication for signal transmission according to an exemplary embodiment of the present invention.

FIG. 9 shows a flowchart of a communication method for signal transmission according to an exemplary embodiment of the present invention.

In a peer aware communication system according to an exemplary embodiment of the present invention, a transmitting apparatus generates and transmits a preamble signal before transmitting a message signal. The transmitting apparatus generates a preamble signal that is clearly distinct from a preamble signal of the other unlicensed band system (S100), and transmits the preamble signal with a subcarrier satisfying the predetermined condition. For example, among the subcarriers within the predetermined range (the subcarriers between the −28th subcarrier and the +28th subcarrier), the preamble signal is transmitted by using the even-numbered subcarriers except for the subcarriers of the −16th, the 0th, and the +16th (S110 and S120).

In the interval in which a preamble signal or a message signal is not transmitted, a block signal is generated and transmitted.

That is, the transmitting apparatus generates a block signal in the interval in which a preamble signal or a message signal is not transmitted (S130 and S140).

As an example of generating the block signal, the block signal is generated by calculating $b_n$ based on Equation 6 and then multiplying the $b_n$ by a predetermined block signal subcarrier gain. When a block signal in a frequency domain is defined as Equation 2 and the block signal subcarrier gain is set as "5", the block signal may be represented as follows.

$$c_n = \frac{5}{8}\left(e^{-j\frac{n\pi}{2}} + e^{j\frac{n\pi}{2}}\right), n = 0, 1, \ldots, 79 \qquad \text{[Equation 8]}$$

The block signal according to Equation 8 represents a block signal per symbol.

A terminal repeatedly transmits such block signal, and particularly, transmits a block signal with the −16th subcarrier and the +16th subcarrier included in the predetermined range (S150 and S160).

Through the block signal transmission, the other unlicensed band system recognizes that the peer aware communication system now occupies a channel. A preamble signal or a message signal is transmitted in the interval in which the block signal is not transmitted (S170), and the preamble signal is processed and transmitted as the description above.

Figure 10:
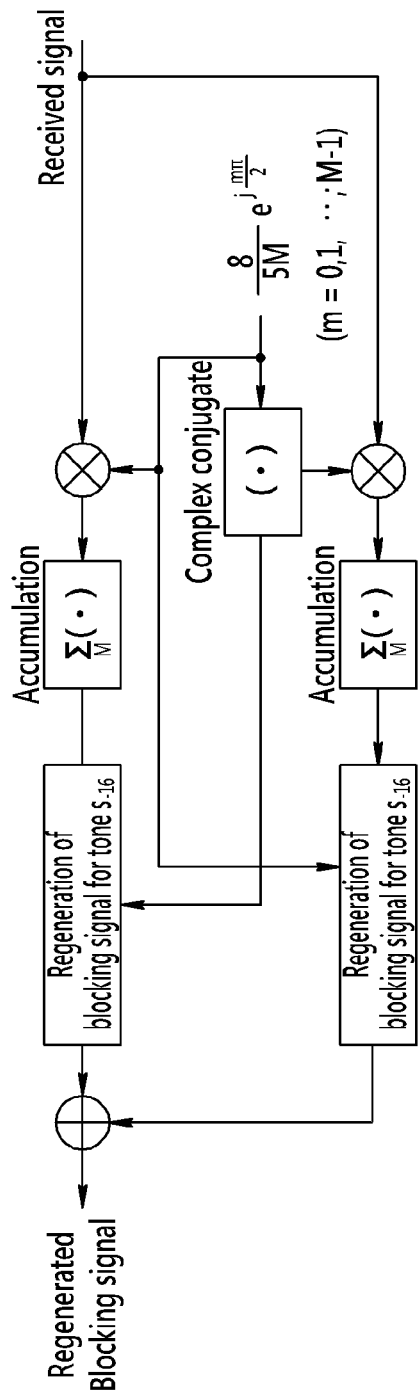
FIG. 10 shows a flowchart of a communication method for signal receiving according to an exemplary embodiment of the present invention.

FIG. 10 shows a flowchart of a communication method for signal receiving according to an exemplary embodiment of the present invention.

When receiving a signal from a corresponding terminal of the peer aware communication system (S300), a receiving apparatus removes a block signal from the received signal.

The receiving apparatus estimates a channel of a block signal from the received signal to obtain a channel estimate of the block signal (S310) and estimates the component of the block signal, that is, a block signal value in a time domain (S320). Then, the receiving apparatus regenerates the block signal included in the received signal by using the channel estimate of the block signal and the block signal value in a time domain (S330).

Figure 11:
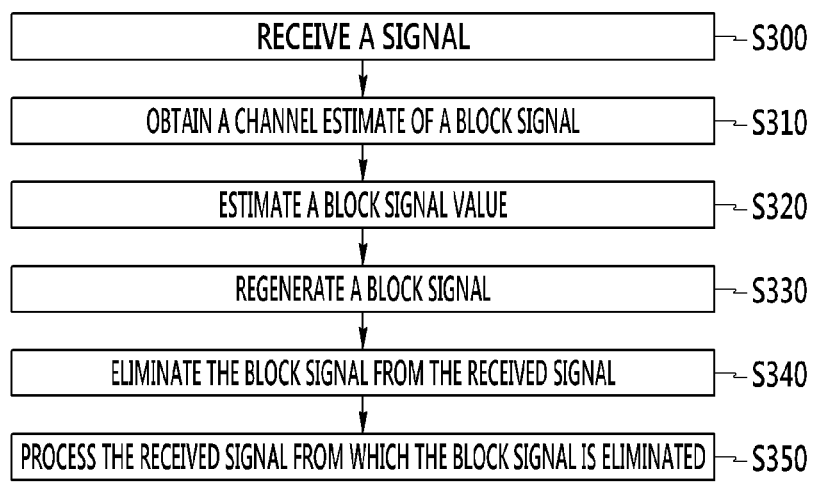
FIG. 11 represents a regeneration process of a block signal according to an exemplary embodiment of the present invention.

FIG. 11 represents a regeneration process of a block signal according to an exemplary embodiment of the present invention.

A transmitting apparatus transmits block signals with the predetermined subcarriers, for example, the +16th subcarrier and the +16th subcarrier, and a receiving apparatus estimates the component of the block signal corresponding to the +16th subcarrier in a time domain and the component of the block signal corresponding to the −16th subcarrier in a time domain, respectively. As the upper path shown in FIG. 11, the component of the block signal corresponding to the −16th subcarrier in a time domain and the received signal are multiplied by each other and are accumulated, and then a received signal corresponding to the −16th subcarrier is regenerated. As the lower path shown in FIG. 11, the component of the block signal corresponding to the +16th subcarrier in a time domain and the received signal are multiplied by each other and are accumulated, and then a received signal corresponding to the +16th subcarrier is regenerated. Finally, by adding the received signal corresponding to the −16th subcarrier and the received signal corresponding to the +16th subcarrier, a block signal is regenerated.

Meanwhile, the receiving apparatus delays the received signal by M predetermined samples and then outputs it. Here, M is an integer and represents a length of an interval for estimating a channel of a block signal. The receiving apparatus subtracts the regenerated block signal from the delayed received signal to eliminate the block signal from the received signal (S340).

The received signal from which the block signal is eliminated is rearranged as a parallel signal and the CPs are eliminated therefrom. The received signal from which the CPs is processed by fast Fourier transform (FFT) and then is output as a signal in a frequency domain. When the signal in a frequency domain that is obtained as above is a preamble signal, channel estimation is performed, and when the signal in a frequency domain that is obtained as the above is a message signal, demodulation for the signal is performed to obtain data (S350).

Figure 12:
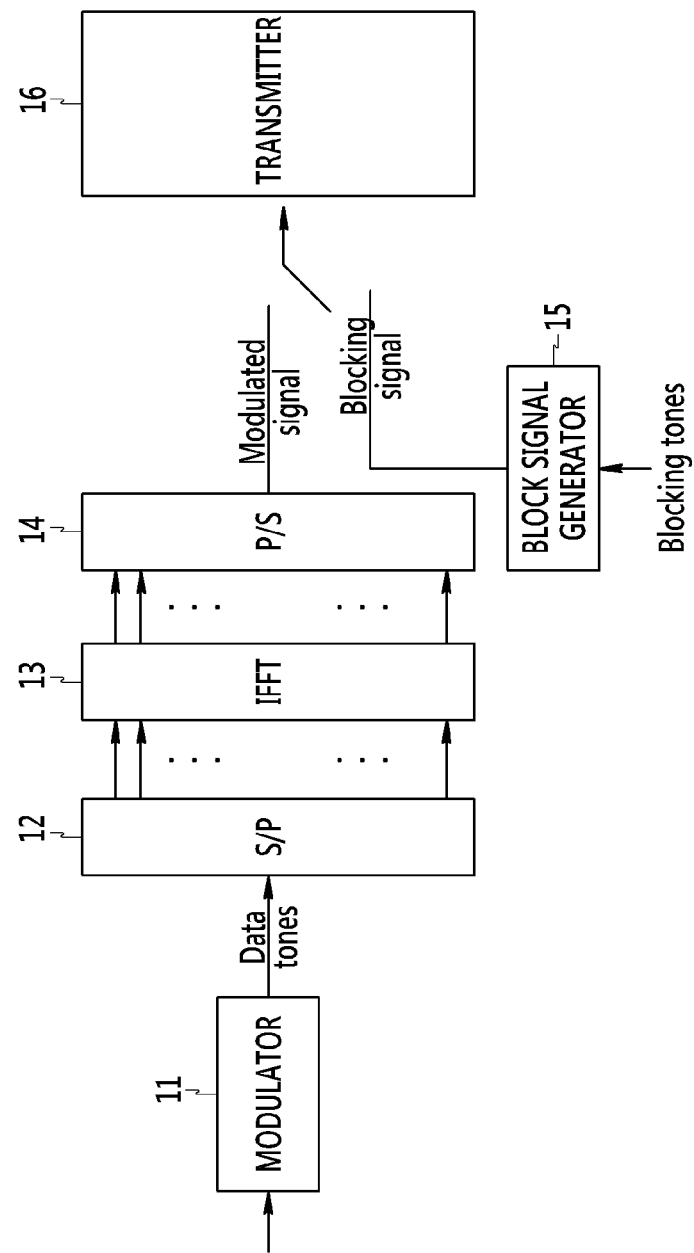
FIG. 12 shows a block diagram of a transmitting apparatus according to an exemplary embodiment of the present invention.

FIG. 12 shows a block diagram of a transmitting apparatus according to an exemplary embodiment of the present invention.

A transmitting apparatus 1 for time division transmission of a control signal, a data signal, and a block signal in a peer aware communication system according to an exemplary embodiment of the present invention includes, as shown in FIG. 12, a modulator 11, a first signal converter 12, an IFFT processor 13, a second signal converter 14, a block signal generator 15, and a transmitter 16. Here, the first signal converter 12 is a serial to parallel converter and the second signal converter 14 is a parallel to serial converter.

Preamble signals, various control signals, and data packets are modulated by the modulator 11 and are transmitted through a plurality of subcarriers based on OFDM. A subcarrier is allocated to the signal that is modulated by the modulator 11 (preamble signals, message signals, and others) and then is converted through the first signal converter 12. The signal to which the subcarrier is converted to a signal in a time domain and a CP are inserted to the signal in a time domain. The signal to which the CP is inserted is converted through the second signal converter 14 and then is transmitted. The preamble signal is transmitted with the even-numbered subcarriers except for the n-th subcarriers (e.g., the −16th, the 0th, and the +16th) among the subcarriers (the subcarriers between the −28th subcarrier and the +28th subcarrier) included within the predetermined range.

The transmitter 16 transmits the signal output from the second signal converter 14. The transmitter 16 transmits a block signal provided from the block signal generator 15 at a time in which a message signal is not transmitted in the signal transmission interval (e.g., intervals for transmitting a discovery signal, a peering signal, a PID signal, and a DS-REQ/RSP signal).

The block signal generator 15 generates a block signal and sends it to the transmitter 15. The block signal is transmitted with the n-th subcarriers (e.g., the −16th subcarrier and the +16th subcarrier) included in the predetermined range.

Figure 13:
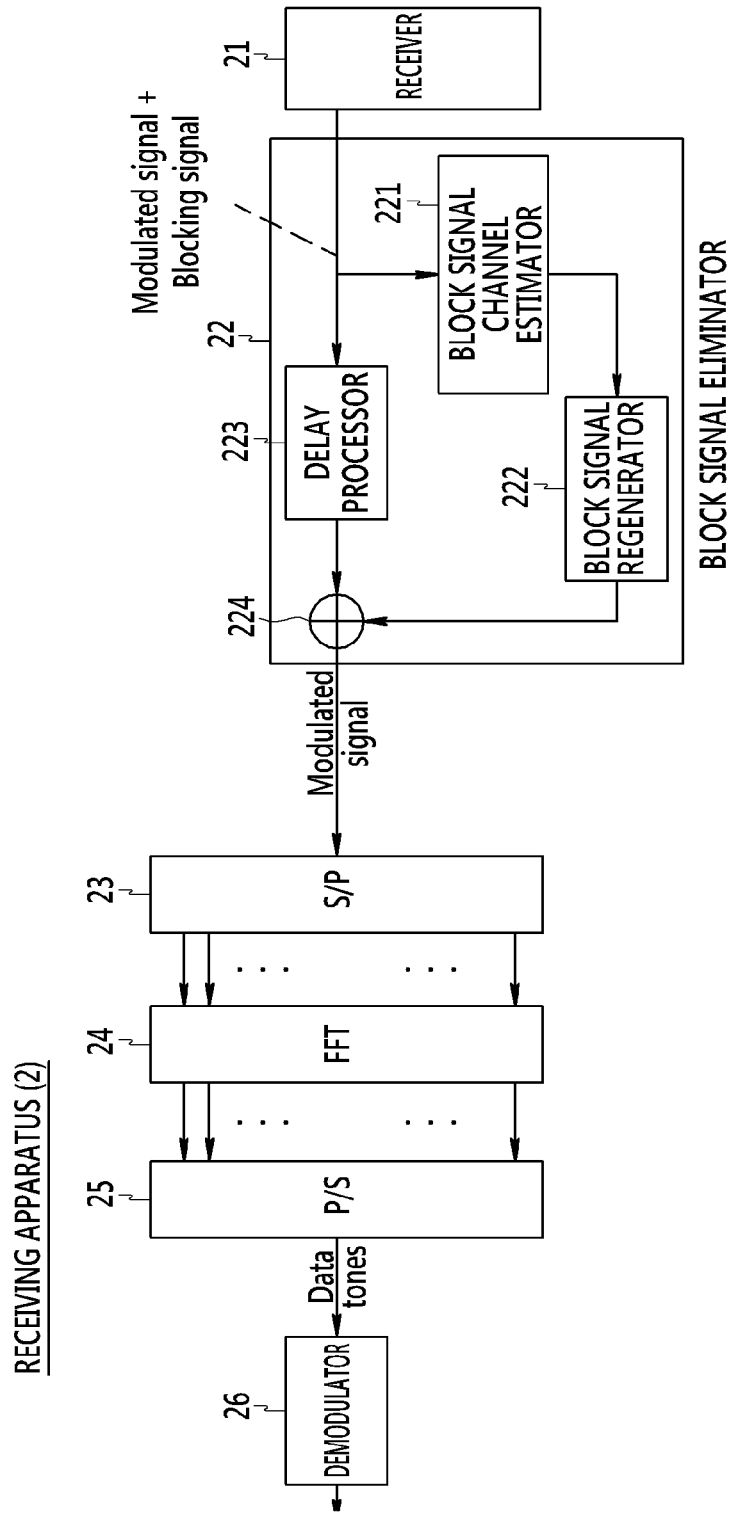
FIG. 13 shows a block diagram of a receiving apparatus according to an exemplary embodiment of the present invention.

FIG. 13 shows a block diagram of a receiving apparatus according to an exemplary embodiment of the present invention.

A receiving apparatus 2 according to an exemplary embodiment of the present invention includes, as shown in FIG. 13, a receiver 21, a block signal eliminator 22, a first signal converter 23, an FFT processor 24, a second signal converter 25, and a demodulator 26. Here, the first signal converter 23 represents a serial to parallel converter and the second signal converter 25 represents a parallel to serial converter.

When a signal transmitted from the transmitting apparatus 1 is received by the receiver 21 of the receiving apparatus 2, the block signal eliminator 22 operates. The block signal eliminator 22 may operate separately from the others (23-26).

The block signal eliminator 22 includes a block signal channel estimator 221, a block signal regenerator 222, a delay processor 223, and a signal eliminator 224.

The block signal channel estimator 221 estimates a channel for a block signal with the received signal provided from the receiver 21.

The block signal regenerator 222 obtains a block signal value in a time domain from the received signal, and regenerates the block signal included in the received signal by using the channel estimate for the block signal and the block signal value in a time domain.

The delay processor 223 delays the received signal by M predetermined samples and outputs it. Here, the M is an integer that represents a length of an interval for estimating the channel of the block signal.

The signal eliminator 224 performs subtracting of the block signal output from the block signal regenerator 222 from the delayed received signal output from the delay processor 223 to eliminate the block signal from the received signal.

The received signal (e.g., a preamble signal, a message signal, and others) from which the block signal is eliminated through the block signal eliminator 22 is rearranged through the first signal converter 23, and the CP is eliminated from the received signal. The signal from which the CP is eliminated is converted into a signal in a frequency domain by the FFT processor 24 and then is rearranged and output through the second signal converter 25.

After the above processing, the preamble signal is used for estimating a channel and the message signal is processed by the demodulator 26.

In the above receiving apparatus, the remaining elements 23, 24, 25, and 26 except for the block signal eliminator 22 may be uniformly referred to as "a received signal processor" for processing a received signal from which a block signal is eliminated.

According to an exemplary embodiment of the present invention, it is possible to prevent signal collision between a peer aware communication system and other systems using different communication standards in an unlicensed band. That is, when occupying a channel, the peer aware communication system transmits a block signal with some subcarriers in the interval in which data is not transmitted to inform other systems using the unlicensed band of the channel occupation, and thereby the signal collision may be minimized.

Also, time synchronization, carrier frequency synchronization, and channel estimation between terminals may be possible in the synchronous peer aware communication system by transmitting a preamble signal with subcarriers satisfying a predetermined condition.

Particularly, the position of the subcarrier for the preamble signal is different from that of the subcarrier for the block signal in a frequency domain, and thereby the interference caused by the block signal may be minimized.

In addition, the interference caused by the block signal may be minimized by using a block signal eliminator in a receiving end. Accordingly, in a case in which the peer aware communication system and other systems using different communication standards coexist in an unlicensed band, the interactive interference between them may be minimized and the performance of the peer aware communication system may be maximized.

The exemplary embodiments of the present invention may be implemented through the above-described apparatus and/or method, and may also be implemented with a program for realizing the functions corresponding to the elements of the exemplary embodiments of the present invention, and a recording medium storing the program. These implementations may be easily achieved from the description of the exemplary embodiments by a person of ordinary skill in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A receiving apparatus in a peer aware communication system, comprising:
a receiver for receiving a signal;
a block signal eliminator for eliminating a block signal from the received signal, wherein the block signal informs of channel occupation and is transmitted through an interval in which a message signal including a preamble signal is not transmitted; and
a received signal processor for processing the received signal from which the block signal is eliminated,
wherein the received signal processor includes:
a block signal channel for estimating a channel of the block signal based on the received signal to obtain a channel estimate of the block signal,
a block signal regenerator for estimating a block signal values of the block signal in a time domain and regenerating the block signal based on the channel estimate of the block signal and the block signal value of the block signal in a time domain,
a delay processor for delaying and outputting the received signal, and
a signal eliminator for subtracting the regenerated block signal from the delayed received signal to eliminate the block signal from the received signal.

2. The receiving apparatus of claim 1, wherein a subcarrier for the block signal is different from a subcarrier for the preamble signal.

3. The communication method of claim 1, wherein transmission power of the block signal is equal to or higher than that of data.

4. A communication method in a peer aware communication system, comprising: receiving, by a receiving apparatus, a signal transmitted from a transmitting apparatus with a block signal that informs of channel occupation and is transmitted from another transmitting apparatus through an interval in which a message signal including a preamble signal is not transmitted from said another transmitting apparatus;
regenerating, by the receiving apparatus, the block signal based on the received signal; and
subtracting, by the receiving apparatus, the regenerated block signal from the received signal to eliminate the block signal from the received signal.

5. The communication method of claim 4, wherein a subcarrier for the block signal is different from a subcarrier for the preamble signal.

6. The communication method of claim 4, wherein the block signal is transmitted in a case in which the peer aware communication system and other systems using different communication standards coexist in an unlicensed band.

7. The communication method of claim 4, further comprising:
generating, by the transmitting apparatus, a preamble signal; and
transmitting, by the transmitting apparatus, the preamble signal with subcarriers satisfying a predetermined condition.

8. The communication method of claim 7, wherein the subcarriers satisfying a predetermined condition include an even-numbered subcarrier except for predetermined subcarriers among subcarriers included within a predetermined range.

9. The communication method of claim 8, wherein the subcarrier for the block signal includes the predetermined subcarriers.

10. The communication method of claim 9, wherein at least two of the predetermined subcarriers are used for transmitting the block signal.

11. The communication method of claim 9, wherein in the transmitting of the preamble signal, the preamble signal is transmitted through a discovery channel in a frequency domain, wherein among the entire subcarriers included in symbols that are used in transmitting the preamble signal on the discovery channel, the subcarriers satisfying the predetermined condition are used for transmitting the preamble signal and the predetermined subcarriers are used for transmitting the block signal.

12. The communication method of claim 4, wherein the regenerating of a block signal includes:
estimating a channel of the block signal based on the received signal to obtain a channel estimate of the block signal;
estimating a block signal values of the block signal in a time domain; and
regenerating the block signal based on the channel estimate of the block signal and the block signal value of the block signal in a time domain.

13. The communication method of claim 4, wherein the subtracting the regenerated block signal includes:
delaying the received signal by a predetermined number of samples; and
subtracting the regenerated block signal from the delayed received signal to eliminate the block signal from the received signal.

14. The receiving apparatus of claim 4, wherein transmission power of the block signal is equal to or higher than that of data.

* * * * *